United States Patent [19]
Devilbiss et al.

[11] Patent Number: 5,528,485
[45] Date of Patent: *Jun. 18, 1996

[54] POWER CONTROL CIRCUIT FOR IMPROVED POWER APPLICATION AND CONTROL

[76] Inventors: Roger S. Devilbiss, 4401 Caruth Blvd., Dallas, Tex. 75225; Tony M. Quisenberry, 67 Remington Dr., Highland Village, Tex. 75067

[*] Notice: The term of this patent shall not extend beyond the expiration date of Pat. No. 5,371,665.

[21] Appl. No.: 402,196

[22] Filed: Mar. 10, 1995

Related U.S. Application Data

[63] Continuation-in-part of Ser. No. 330,424, Oct. 28, 1994, which is a continuation of Ser. No. 212,147, Mar. 14, 1994, Pat. No. 5,371,665.

[51] Int. Cl.⁶ .............................. H02M 5/42; H02P 5/34
[52] U.S. Cl. .............................................. 363/89; 318/800
[58] Field of Search .................................. 363/78, 79, 80, 363/84, 89; 62/3.2, 3.3; 219/482, 490, 494, 497; 318/800

[56] References Cited

U.S. PATENT DOCUMENTS

| | | | |
|---|---|---|---|
| 2,416,152 | 2/1947 | Braun | 165/185 |
| 2,713,655 | 7/1955 | Grubman | 165/185 |
| 3,584,291 | 6/1971 | Bunick et al. | 323/236 |
| 3,612,970 | 10/1971 | Sofan | 318/721 |
| 4,187,535 | 2/1980 | Wigley et al. | 363/16 |
| 4,301,658 | 11/1981 | Reed | 62/3.7 X |
| 4,459,466 | 7/1984 | Bailey | 219/490 |
| 4,587,563 | 5/1986 | Bendell et al. | 358/213 |
| 4,833,888 | 5/1989 | Kerner et al. | 62/3.3 |
| 4,844,072 | 7/1989 | French et al. | 128/400 |
| 4,935,864 | 6/1990 | Schmidt et al. | 363/141 |
| 5,030,898 | 7/1991 | Hokanson et al. | 318/146 |
| 5,035,052 | 7/1991 | Suzuki et al. | 29/890.046 |
| 5,043,560 | 8/1991 | Masreliez | 219/497 |
| 5,097,829 | 3/1992 | Quisenberry | 128/400 |
| 5,128,517 | 7/1992 | Bailey et al. | 219/506 |
| 5,128,854 | 7/1992 | Raets | 363/89 |
| 5,172,689 | 12/1992 | Wright | 128/400 |
| 5,174,121 | 12/1992 | Miller | 62/3.7 |
| 5,190,032 | 3/1993 | Zacol | 128/400 |
| 5,197,294 | 3/1993 | Galvan et al. | 62/3.62 |
| 5,213,152 | 5/1993 | Cox | 165/5 |

FOREIGN PATENT DOCUMENTS

| | | |
|---|---|---|
| 4036210 | 5/1992 | Germany. |
| 0188855 | 11/1982 | Japan. |

*Primary Examiner*—Matthew V. Nguyen
*Attorney, Agent, or Firm*—Jenkens & Gilchrist

[57] ABSTRACT

A power supply and power control circuit for providing a variable and controlled DC voltage to a DC load. The circuit includes an electrical power source; a rectifying device to provide rectified alternating current from the electrical power source; a comparator device; circuitry for providing a predetermined voltage to the inverting input of the comparator device derived from the rectified alternating current; a sensor device to monitor a sensed value associated with the DC load; circuitry for providing an adjustable DC voltage to the non-inverting input of the comparator; a programmable control device to receive an output from the sensor device and provide an output to the circuitry for providing an adjustable DC voltage; a switching device connected between the DC load and the rectified alternating current; and control circuitry which is coupled between the switching device and the output of the comparator device and is controlled by the output of the comparator device. The control circuitry activates and deactivates the switching device to apply power to the DC load when the sensed value of the DC load is different than the desired set point value to maintain the sensed value at the desired set point with minimum variations therefrom.

18 Claims, 4 Drawing Sheets

POWER CONTROL CIRCUIT FOR IMPROVED POWER APPLICATION AND CONTROL

This application is a continuation-in-part of U.S. patent application Ser. No. 08/330,424 filed Oct. 28, 1994 which is a continuation of U.S. patent application Ser. No. 08/212,147 filed Mar. 14, 1994, now U.S. Pat. No. 5,371,665.

BACKGROUND OF THE INVENTION

1. Field of the Invention

The present invention relates to DC power supplies, and more particularly, but not by way of limitation, to a power supply and control circuit incorporating an improved design for supplying a variable DC voltage to a device.

2. History of the Prior Art

Power supplies are widely used in industrial and commercial applications to provide DC potentials for electrical and electronic equipment. Power supplies are generally included as an integral part of equipment which requires DC potentials, but also exist as self-contained units. The primary function of any power supply is to convert AC power to useful DC potentials. This conversion process requires at least two and usually three operations which include rectification, filtering and regulation or control.

Many present designs use high-frequency switching power supplies or use transformers to supply the appropriate voltage or voltages. Switching power supplies tend to be expensive and run at a high frequencies possibly causing electro-magnetic interference or leakage current problems. Transformers tend to be heavy, bulky and expensive. In many applications, special transformers must be designed which increases the cost.

Two applications, among others, of the present invention include providing power to and control of the speed of DC motors, providing power for the charging of batteries, etc. DC motors would benefit from the present invention through more efficient power application, lighter weight, lower cost and the absence of the need for high frequency pulse width modulation (PWM) control. A variable voltage output would be provided to the DC motor depending on the voltage needed to acquire the desired motor speed.

Batteries and the charging thereof would benefit because the present invention would provide a smaller, lighter weight and reduced cost alternative to transformer-based linear power supplies or high frequency switching power supplies. Current capabilities of more than ten amps DC can be achieved for charging by the present invention without the cost and weight required by a transformer rated as such a high current. In addition, the efficiency of the present invention is greater than that obtained using a transformer.

The present invention provides an improvement over the prior art by providing a smooth DC voltage for use with DC motors and the charging of batteries and eliminates the use of bulky inductors or transformers, does not operate at high frequencies typical of switching power supplies and maintains a low part count.

SUMMARY OF THE INVENTION

The present invention relates to an improved power supply and control circuit for supplying a variable DC voltage to a DC load. More particularly, one aspect of the present invention comprises the pulse positioning of power to a filter capacitor and the DC load to apply the required DC voltage across the DC load to maintain a set voltage or power.

Another aspect of the present invention comprises an improved direct current power supply controller scheme utilizing a standard alternating current input voltage. The "pulse positioning" scheme places a high current transistor in the conduction mode when the nominal voltage across the load is below the desired voltage. When the high current transistor is in the non-conducting state, a filter capacitor supplies the current to the load, thus providing a non-isolated DC current to the load.

Another aspect of the present invention comprises a power control circuit for improved speed control of a DC motor to maintain the speed thereof at a set point or a set speed. The circuit includes an electrical power source; a rectifying device to provide rectified alternating current from the electrical power source; a comparator device; circuitry for providing a predetermined voltage to the inverting input of the comparator device derived from the rectified alternating current; a sensor device to monitor the speed associated with the DC motor; circuitry for providing an adjustable DC voltage to the non-inverting input of the comparator; programmable control device to receive an output from the sensor device and provide an output to the circuitry for providing an adjustable DC voltage, the value of the output being determined by the difference between the speed of the DC motor and the set point speed; a switching device connected between the DC motor and the rectified alternating current; and control circuitry which is coupled between the switching device and the output of the comparator device and is controlled by the output of the comparator device, the control circuitry activates the switching device to apply power to the DC motor when the operating speed of the DC motor is above the set point speed as indicated by the output of the comparator device and deactivating the switching device when the operating speed is below the set point speed to maintain the DC motor at the set point speed with minimum variations therefrom.

Another aspect of the present invention comprises a power control circuit for improved charging of a battery. The circuit includes an electrical power source; a rectifying device to provide rectified alternating current from the electrical power source; a comparator device; circuitry for providing a predetermined voltage to the inverting input of the comparator device derived from the rectified alternating current; circuitry for providing a predetermined voltage to the non-inverting input of the comparator device derived from the rectified alternating current; regulator circuitry connected between the output of the power control circuit and the battery; and control circuitry which is coupled between the switching device and the output of the comparator device and is controlled by the output of the comparator device, the control circuitry activates the switching device to apply a constant voltage with high current capabilities to the regulator circuitry.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
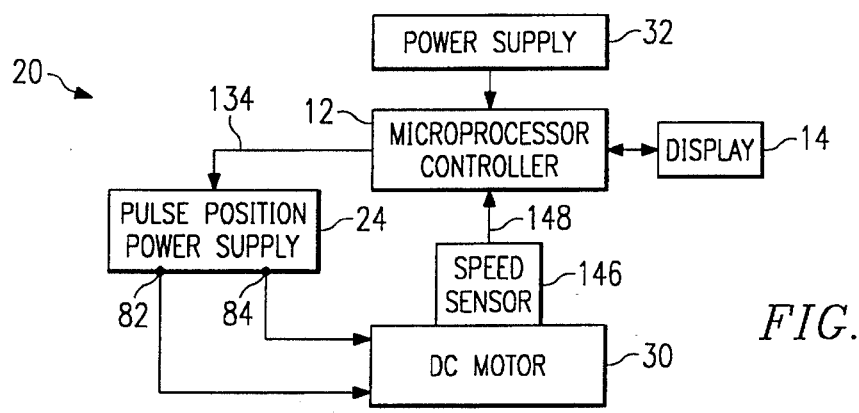
FIG. 1 is a block diagram of a DC motor having a power supply according to the embodiment of the present invention.

Referring first to FIG. 1, there is shown in block diagram form, a DC motor controller 20 operatively connected to a DC motor 30. DC motor controller 20 comprises a pulse position power supply 24, a microprocessor controller or speed control circuitry 12, power supply 32 and display 14. The various desired speeds of the DC motor are programmed into the microprocessor controller or speed control circuitry 12 and the actual speed which is desired at the present time of operation is selected and then displayed on display 14. The actual speed of the DC motor 30 is sensed by speed sensor 146 and a signal indicative of that sensed speed is input to the microprocessor controller 12 via line 148. A pulse width modulated (PWM) signal is transmitted to the pulse position power supply 24 via line 134 which causes the pulse position power supply 24 to provide the appropriate power to DC motor 30 to bring the DC motor 30 to the desired speed and to maintain that speed.

Figure 2:
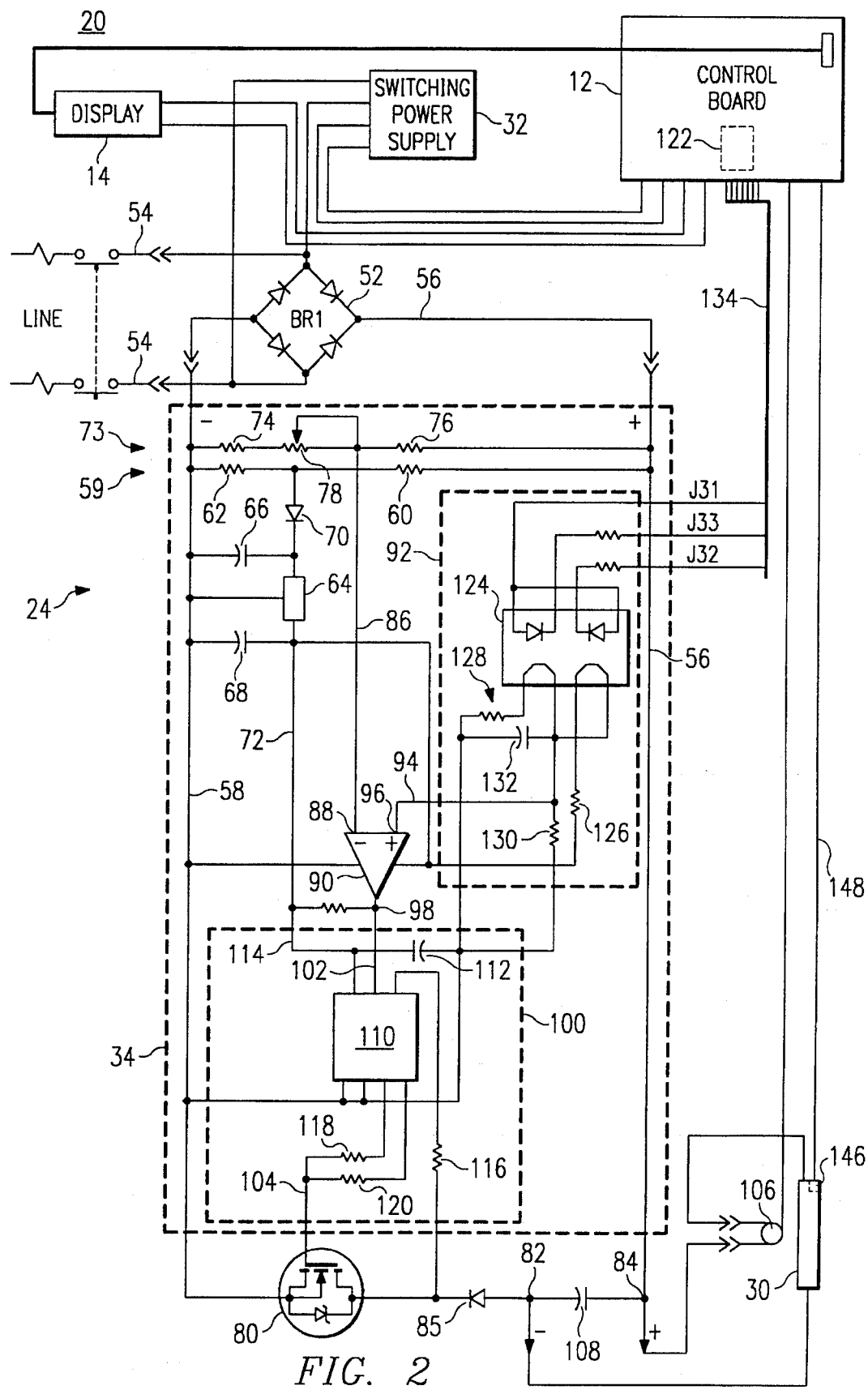
FIG. 2 is an electrical diagram of the power supply of the present invention and the DC motor whose speed is controlled thereby.

Referring now to FIG. 2, the pulse position power supply 24 comprises a power source in the form of a bridge rectifier 52 and power control board or circuitry 34. A standard AC input voltage 54 (115 volts AC@60 Hz) is applied to the input of bridge rectifier 52 which provides about 103 volts DC with about 50 volts rms AC at its output across lines 56 and 58. It will be appreciated that the AC input voltage can be 115 volts AC@400 Hz, 220 volts AC@50–60 Hz (single phase or three phase) with the proper interface elements, if required. A voltage divider 59 comprising resistors 60 and 62 across lines 56 and 58 provides voltage regulator 64 and filter capacitors 66 and 68 with power through protection diode 70 such that the output of voltage regulator 64 is at a predetermined level of about 12 volts DC on line 72.

A second voltage divider 73 comprising resistors 74 and 76 and variable potentiometer 78 across lines 56 and 58 is tuned by varying potentiometer 78 to provide the maximum desired voltage across the DC motor 30 or the maximum desired on-time (maximum pulse position) for the high current transistor (an FET) 80. Protection diode 85 is connected between terminal 82 and high current transistor 80. The output from voltage divider 73 is applied via line 86 to the inverting input 88 of comparator 90.

Figure 3:
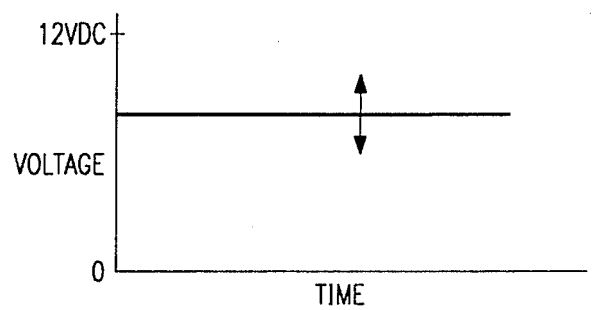
FIG. 3 is a view of the waveform of the adjustable DC reference signal applied to the comparator of the present invention.
Figure 4:
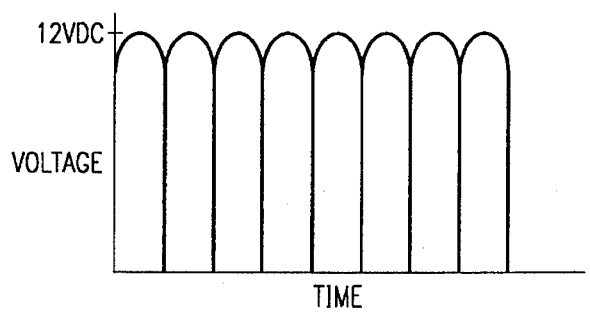
FIG. 4 is a view of the waveform of the signal applied to the inverting input of the comparator of the present invention.
Figure 5:
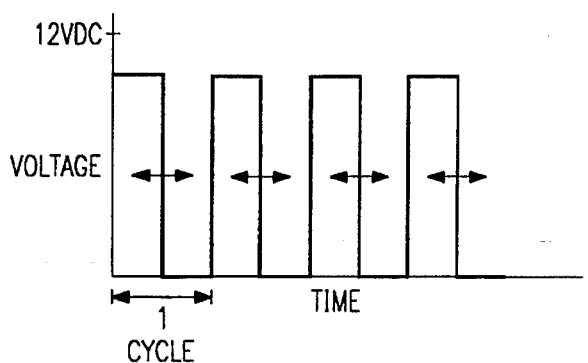
FIG. 5 is a view of the waveform of the pulse position output to the high current transistor of the present invention.

The control signal which is output from the pulse positioning control circuit 92 is applied via line 94 to the non-inverting input 96 of comparator 90 and is used to adjust the control output 98 from comparator 90 which is input to the transistor control network 100 via line 102. The control signal is adjustable (see FIG. 3) by the pulse positioning control circuit 92 from about zero volts DC to about 12 volts DC and is compared to the output from voltage divider 73 (see FIG. 4). The control output 98 of comparator 90, which is constant in value but is variable in width, is provided to the transistor control circuit 100 which provides the high current transistor 80 with "pulse positioning" control (i.e. specifying when the high current transistor 80 is conducting or not conducting) on line 104. The pulse position output on line 104 to high current transistor 80 is shown in FIG. 5. The trailing edge of the pulse varies in position as the width of the pulse changes. As previously noted, the output from voltage divider 73 is adjustable such that you can tune the maximum voltage across the DC motor 30 to the appropriate Vmax of the motor.

When the pulse positioning control circuit 92 reduces the non-inverting input of comparator 90 to 0 volts DC, the high current transistor 80 is turned off. As the non-inverting DC signal is increased, the pulse positioning time is increased (the width of the pulse to the high current transistor 80 is increased). The predetermined voltage (about 12 VDC) applied to the inverting input 88 of comparator 90 is tied to the fully rectified input waveform, and when compared to the non-inverting input 96 provides pulses which are variable in width. The high current transistor 80 is turned on until the desired nominal voltage occurs across terminals 82 and 84 which is necessary to maintain the speed of DC motor 30. The voltage across terminals 82 and 84 is applied across the input of DC motor 30 through the hall effect current sensor 106. The output of the hall effect current sensor 106 is provided to the microprocessor controller 12 for safety purposes. Once at the desired voltage, the high current transistor 80 is turned off and the filter capacitor 108 provides the power to the DC motor 30 for the balance of the cycle.

The high current transistor 80 is in the conduction state when the voltage at terminals 82 and 84 (across DC motor 30 in series with the hall effect current sensor 106) is at or below the nominal voltage that is desired for the selected speed of DC motor 30. The high current transistor 80 is not conducting when the voltage at terminals 82 and 84 is above the desired voltage level. When the high current transistor 80 is not conducting, capacitor 108 supplies the appropriate amount of current for the balance of the cycle such that the DC motor 30 sees a DC voltage with less than a 5% ripple.

Transistor control network 100 comprises a FET driver and protection device 110 (an SI9910) which will protect the comparator circuitry 90 if the high current transistor 80 fails. Capacitor 112 is a filter capacitor for the 12 volts DC applied to the FET driver and protection device 110 via line 114. The "pulse positioned" control output 98 from comparator 90 is input to FET driver and protection device 110 which provides the proper output to the high current transistor 80 to control the conduction thereof. Resistor 116 is provided to sense any overvoltage condition and turn off the high current transistor 80 before damage occurs to the high current transistor 80. Resistors 118 and 120 provide impedance matching to ensure that the proper signal is seen at the high current transistor 80.

The pulse positioning control circuit 92 interfaces the control signal from the programmable control means 122 in the microprocessor controller 12 to the comparator 90 and comprises an opto-isolator 124, resistor 126 which is a pull-up resistor to 12 volts DC and filter 128 comprising resistor 130 and capacitor 132. The programmable control means 122 in the microprocessor controller 12 comprises a microprocessor and appropriate software and outputs a pulse width modulated (PWM) 0 to 5 volts DC control signal which is input to the power control board 34 on terminals J32 and J33 via line or cable 134. The PWM 0 to 5 volts DC control signal is passed through opto-isolator 124 whereupon it is transformed to a 0 to 12 volt DC signal by filter 128 and resistor 126 and is applied via line 94 to the non-inverting input 96 of comparator 90.

In operation, speed sensor 146 provides a signal over line 148 to the microprocessor controller 12 and programmable control means 122. If the speed sensed by speed sensor 146 rises above or below a predetermined value, programmable control means 122 sends a predetermined signal to the pulse positioning control circuit 92 which converts that signal to the proper level of DC voltage and transmits that signal to the non-inverting input 96 of comparator 90. The control output 98 from comparator 90 is sent to the transistor control network 100 which then sends a proper signal to the high current transistor 80 to control the conduction thereof to bring the speed of the DC motor 30 back to the desired speed.

Figure 6:
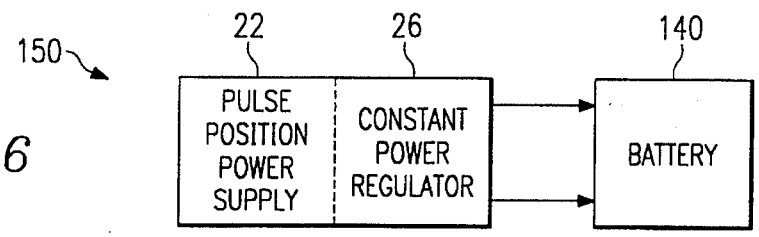
FIG. 6 is a block diagram of a battery and connected battery charger having a power supply according to the embodiment of the present invention.
Figure 7:
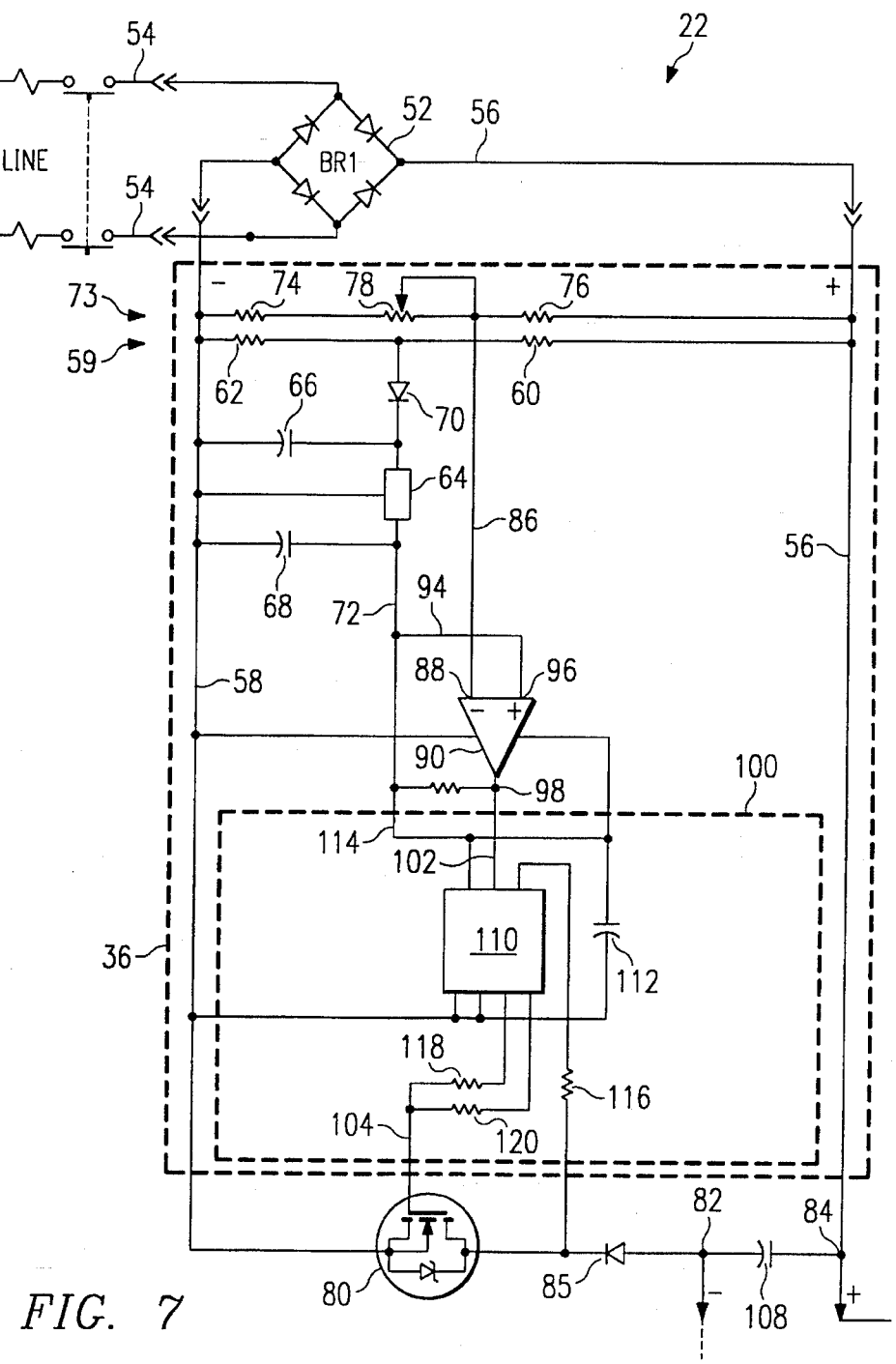
FIG. 7 is an electrical diagram of the power supply of the battery charger of FIG. 6.

Referring now to FIG. 6, there is shown in block diagram form, a battery charger 150 operatively connected to a battery 140 which is to be charged. Battery charger 150 comprises a pulse position power supply 22, as depicted in FIG. 7, and a power regulator 26. The output of the pulse position power supply 22 at terminals 82 and 84 would be connected to the input terminals of the constant power regulator 26 and nothing else would be connected to terminals 82 and 84. With the addition of the constant power regulator, the pulse position power supply 22 would provide the DC voltage and current necessary to charge batteries such as the 24 volt or 48 volt batteries that are typical batteries for use in backup power systems for telecommunication equipment.

With reference to FIG. 7, pulse position power supply 22 differs from the pulse position power supply 24 of FIG. 2 in that the display 14, switching power supply 32, microprocessor controller 12 and pulse positioning control circuitry 92 are not required for the present embodiment. The pulse position power supply 22 can charge at different voltage levels by locking the control signal in the full on condition by connecting the non-inverting input 96 of comparator 90 to line 72, which is at 12 VDC, and then adjusting potentiometer 78 to the output voltage which is desired at terminals 82 and 84. Therefore, whether the application is for charging a 12, 24 or 48 VDC battery, the correct voltage can be easily obtained by the pulse position operation.

Figure 8:
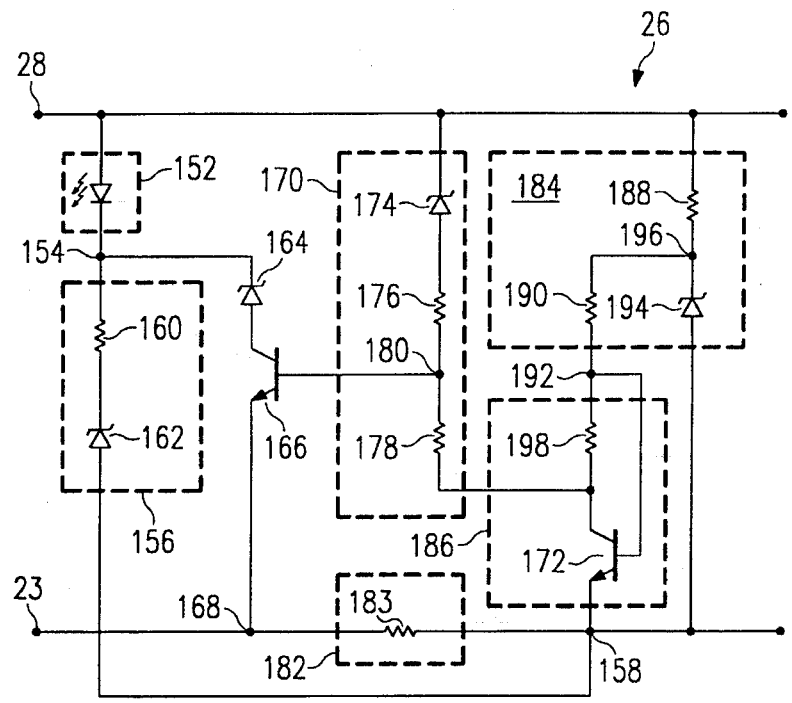
FIG. 8 is an electrical diagram of the constant power regulator shown in FIG. 6.

With reference to FIG. 8, the input terminals 28 and 23 of the constant power regulator 26 are operatively connected to the output terminals 82 and 84 of the pulse position power supply 22 to receive the unregulated DC voltage. Light emitting diode 152 is connected between input terminal 28 and terminal 154 with voltage regulation means 156 connected between terminal 154 and terminal 158. Voltage regulation means 156 comprises resistor 160 in series with zener diode 162. Zener diode 164 and transistor 166 are connected in series between terminals 154 and 168. Voltage compensation means 170 and transistor 172 are connected in series between terminals 28 and 158. Voltage compensation means 170 comprises zener diode 174, resistor 176 and resistor 178 which are all connected in series. The base of transistor 166 is connected to terminal 180 which is between resistors 176 and 178. Current sensor means 182 is connected between terminals 158 and 168 and comprises resistor 183. Current source means 184 is connected in series with temperature compensated bias means 186 between terminals 28 and 158. Current source means 184 comprises resistor 188 and resistor 190 connected in series between terminals 28 and 192. Zener diode 194 is connected between terminals 158 and 196. Temperature compensated bias means 186 comprises resistor 198 connected in series with transistor 172 between terminals 158 and 192.

In operation, the pulse position power supply 22 would provide an unregulated DC voltage to terminals 28 and 23 of the constant power regulator circuit 26. The constant power regulator circuit 26 would increase current limiting when the voltage of battery 140 increases such that the total power applied to the battery is constant over the charging cycle of the battery 140. Under a low charge condition, batteries can typically take a high amount of current to begin the charging cycle. However, with an increasing charge, it is more efficient to limit the charging current as the terminal voltage rises on the battery.

Transistor 166 monitors the voltage across current sensor means 182 (resistor 183). Thus a temperature compensated bias is applied to transistor 166 by the temperature compensated bias means 186 (transistor 172 and resistor 198). Current source means 184 (diode 194 and resistors 188 and 190) applies a constant current to the temperature compensated bias means 186. The transistor 172 bias supply applies a voltage to the base of transistor 166 which is supplemented by an output voltage-dependent bias through the voltage compensation means 170. Diode 174 provides an offset in the current supplied by resistor 176 as a function of the output voltage to achieve a constant power function. Transistor 166 begins to conduct when the summation of the bias on the base of transistor 166 and the voltage across resistor 183 reaches the base-emitter voltage of transistor 166. When this occurs, diode 162 will not conduct and the supply becomes a constant power control instead of a constant voltage controller.

Figure 9:
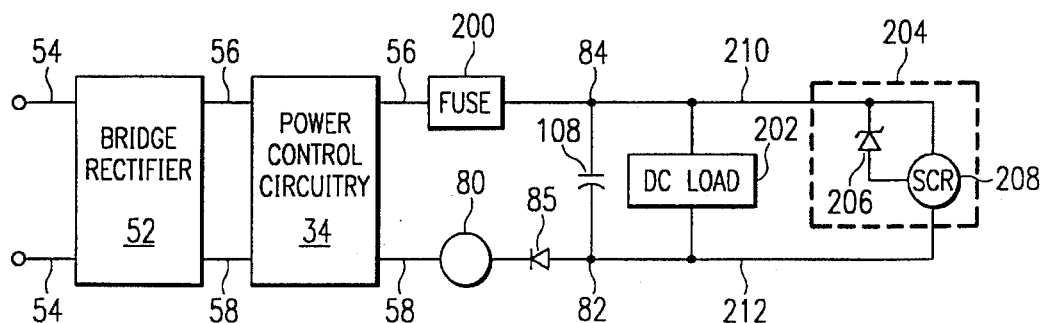
FIG. 9 is a block diagram of the inventive power supply and a protection circuit therefore.

With reference to FIG. 9, there is shown in block diagram form, the bridge rectifier 52 operatively connected to the power control circuitry 34 (or 36). The output of the power control circuitry 34 on lines 56 and 58 include terminals 82 and 84 with capacitor 108 connected therebetween. A fuse or circuit interrupter 200 is operatively connected in line 56. Lines 210 and 212 operatively connect the output terminals 82 and 84 to a DC load 202 and to a protection circuit 204 which comprises a zener diode 206 and an SCR 208.

In order to lower the cost of pulse position power supply 22 (or 24), protection circuit 204 is added to the circuit. With the protection circuit added to the circuit, it is then possible to use a low voltage capacitor for capacitor 108 rather than a more expensive high voltage capacitor. The protection circuit 204 will sense if there is a failure of the high power transistor 80 by sensing an over voltage condition across capacitor 108 and any DC load 202. If the voltage reaches a certain critical predetermined voltage, the protection circuit 204 trips (zener diode 206 will turn on SCR 208 and provide a short across capacitor 108 and any DC load 202) and a short circuit condition exists which cause fuse or circuit interrupter 200 to activate thereby protecting capacitor 108 and any DC load 202.

It is thus believed that the operation and construction of the present invention will be apparent from the foregoing description. While the apparatus shown or described has been characterized as being preferred it will be obvious that various changes and modifications may be made therein without departing from the spirit and scope of the invention as defined in the following claims.

What is claimed is:

1. A power control system for a DC motor to maintain the speed of the DC motor at a set speed, said power control system comprising:

rectifying means for producing rectified alternating current when receiving an input of alternating current;

comparator means having an inverting input, a non-inverting input and an output;

means for providing a predetermined voltage to the inverting input of said comparator means from said rectified alternating current;

sensor means operatively positioned to monitor the speed associated with said DC motor;

means for providing an adjustable DC voltage to the non-inverting input of said comparator;

programmable control means to receive an output from said sensor means and provide an output to said means for providing an adjustable DC voltage, the value of said output being determined by the difference between the sensed speed of said DC motor and the desired set speed of said DC motor;

switching means operatively connected between said DC motor and said rectified alternating current; and control means operatively coupled between said switching means and the output of said comparator means, said control means activates said switch means for a predetermined time, determined by the output from said comparator, to allow the rectified alternating current to reach a desired voltage across said DC motor at which time said control means deactivates said switch means, wherein the value of the desired voltage is determined by the set speed.

2. The system as set forth in claim 1 wherein said electrical power source is about 115 volts AC@60 Hz.

3. The system as set forth in claim 1 wherein said electrical power source is about 115 volts AC@400 Hz.

4. The system as set forth in claim 1 wherein said electrical power source is about 220 volts AC@50–60 Hz.

5. The system as set forth in claim 1 wherein said rectifying means comprises a bridge rectifier.

6. The system as set forth in claim 1 wherein said means for providing a predetermined voltage to the inverting input comprises a voltage divider.

7. The system as set forth in claim 1 wherein said means for providing an adjustable DC voltage to the non-inverting input comprises an opto-isolator operatively coupled to a pull-up resistor and a filter.

8. The system as set forth in claim 1 wherein said sensor means comprises a speed sensor operatively positioned with respect to said DC motor and providing an input to the programmable control means.

9. The system as set forth in claim 8 wherein said programmable control means comprises a microprocessor and associated software.

10. The system as set forth in claim 1 wherein said switching means comprises a high current transistor connected in series with said rectified alternating current and said DC motor.

11. The system as set forth in claim 10 further including a capacitor connected in parallel with said DC motor to supply power to said DC motor when said high current transistor is not activated.

12. The system as set forth in claim 1 wherein said control means comprises a FET driver and a protection diode.

13. The system as set forth in claim 1 further including a circuit interrupter operatively connected in series with said rectified alternating current and said DC motor and a protection circuit connected in parallel with said DC motor, said protection circuit comprising a zener diode operatively connected to a SCR wherein the protection circuit will trip and activate the circuit interrupter when the voltage across the DC motor reaches a predetermined value.

14. A method of controlling the application of power to a DC motor to maintain the speed of the DC motor at a set speed, said method comprising the steps of;

providing an electrical power source for supplying alternating current;

acting on said alternating current to produce rectified alternating current;

providing comparator means, having an inverting input, a non-inverting input and an output;

providing a predetermined value of voltage derived from said rectified alternating current to the inverting input of said comparator means;

determining the operating speed of said DC motor;

providing a voltage to the non-inverting input of said comparator, the value of said voltage being determined by the difference between the determined operating speed of said DC motor and the set speed;

providing switching means operatively connected between said DC motor and a power source; and providing control means which is operatively coupled between said switching means and the output of said comparator means, said control means activating said switching means for a predetermined time, determined by the output from said comparator, to allow the rectified alternating current to reach a desired voltage across said DC motor at which time said control means deactivates said switch means, wherein the value of the desired voltage is determined by the set speed.

15. The method as set forth in claim 14 wherein the value of said predetermined voltage is about 12 volts DC.

16. The method as set forth in claim 14 wherein the value of said voltage provided to the non-inverting input is adjusted by circuitry comprising an opto-isolator operatively coupled to a pull-up resistor and a filter.

17. The method as set forth in claim 14 wherein said switching means comprises a high current transistor.

18. The method as set forth in claim 14 wherein said control means comprises a FET driver and a protection diode.

* * * * *